(No Model.)
O. W. EISENHART.
HORSE DETACHER.
No. 303,563. Patented Aug. 12, 1884.
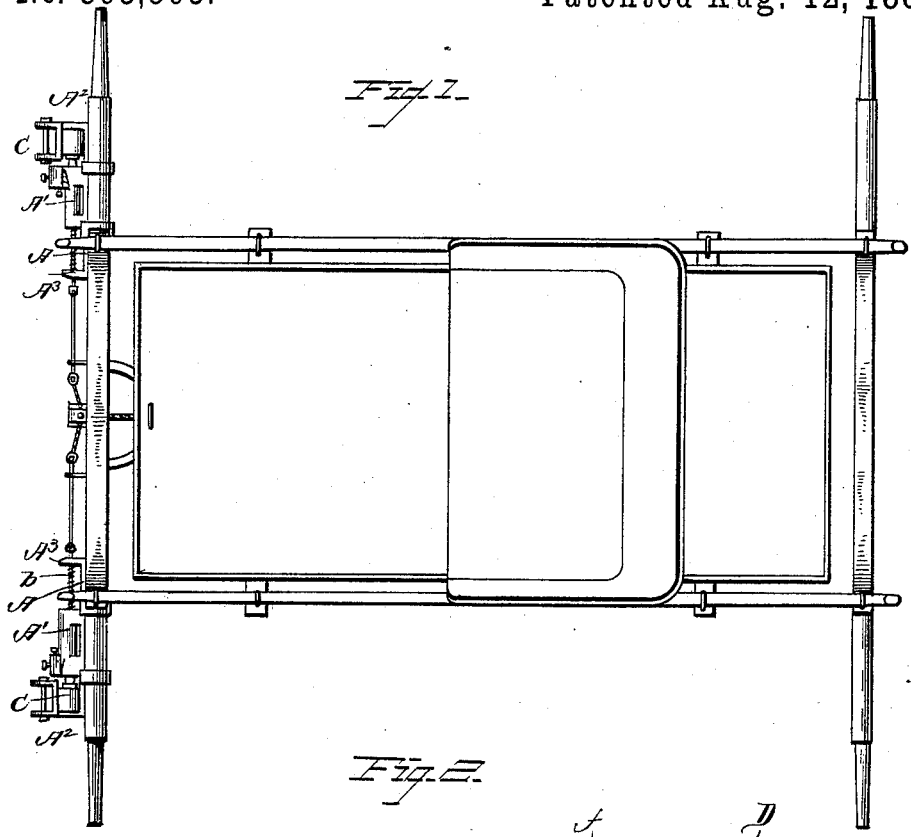
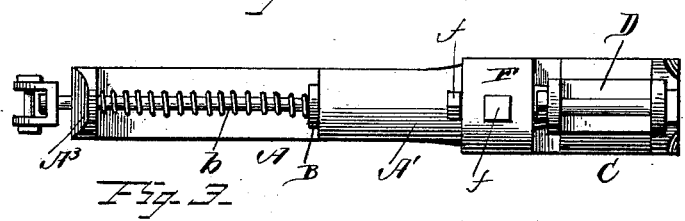
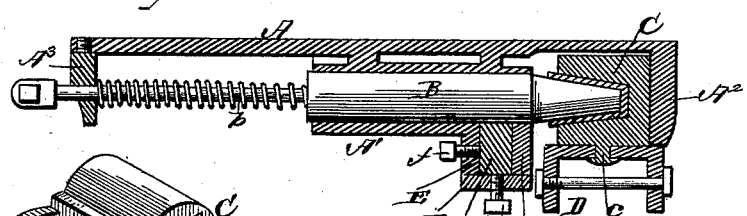
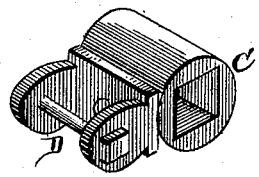
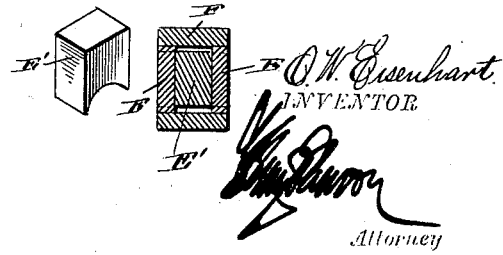
WITNESSES
Franck L. Ourand
E. M. Johnson
O. W. Eisenhart
INVENTOR
Attorney

UNITED STATES PATENT OFFICE.

OSCAR W. EISENHART, OF TREMONT, PENNSYLVANIA.

HORSE-DETACHER.

SPECIFICATION forming part of Letters Patent No. 303,563, dated August 12, 1884.

Application filed January 10, 1884. (No model.)

*To all whom it may concern:*

Be it known that I, OSCAR W. EISENHART, a citizen of the United States of America, residing at Tremont, in the county of Schuylkill and State of Pennsylvania, have invented certain new and useful Improvements in Horse-Detachers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in devices for detaching horses from vehicles; and it consists in providing the front axle of the vehicle with a thill-coupling having a tapering socket in which fits the end of the conical retaining-rod; also, in providing the clip with a swivel-joint.

My invention further consists in the construction and combination of the parts whereby the shafts may be detached from the vehicle, as will be hereinafter more fully set forth, and pointed out in the claims.

In the accompanying drawings, which illustrate my invention, Figure 1 is a plan view showing the same applied to a vehicle. Fig. 2 is a side view. Fig. 3 is a sectional view, and Figs. 4 and 5 being detailed views of certain parts detached.

In the accompanying drawings, A represents the portion which is attached to the front axle, so that the portion A', which is formed thereon, will project outwardly toward the front of the vehicle. The portion A is also provided with outwardly-extending end portions, $A^2$ $A^3$. The end portion $A^3$ is perforated for the passage of the rod, and the portion A' is also provided with a longitudinal opening. Between the portions A' $A^2$ is secured, by means of a sliding bolt, B, which is tapered at its end, the shaft-coupling, which is indicated by the letter C, which coupling is provided with a rectangular tapering socket, in which is placed a socket having a round tapering portion or opening, in which the tapered portion of the sliding bolt B will fit. To this coupling C is attached the clip for the thill-iron, having a perforation through which passes a projecting portion, $c$, formed on the portion C, so that said thill-iron will be allowed a rotary movement upon the coupling, thus preventing the parts from becoming jammed or retained in position should one end of the shaft, when released, fall before the other end, this movement allowing the coupling C to be drawn out of the opening between the parts A' $A^2$ by a direct pull. The portion of the clip D is provided with the usual projecting side wings and retaining-bolt, as is fully illustrated. The sliding bolt B has attached to one end of the same a rod, $b$, over which is placed a spiral spring, which bears, respectively, upon the head of the bolt and the perforated portion $A^3$, the tendency of this spiral spring being to push the bolt toward the portion $A^2$. The outer end of the rod $b$ is provided with a head, over which is secured a clip, which is provided with a transverse bolt for the reception of the operating-rod, which is attached to a lever or other means, whereby the rod $b$ can be operated from the front portion of the vehicle, so as to withdraw the sliding bolt from the thill-coupling. The upper portion of the casting A' is provided at its end nearest the thill-coupling with two upwardly-projecting portions, E E, one of these portions being provided with a set-nut, as shown, and between these upwardly-projecting portions the casting A' is cut away, so as to provide an opening in which is placed a block, E', having its lower end curved. The portions E E' are provided on their upper and lower edges with slots, the cut-away portions upon the block being of greater width than those upon the rigid portions E E. Over these parts is placed a catch, F, which is shaped to fit snugly above the parts just described, and is provided on its side with a projecting tongue which will lie within the groove. By means of these blocks and catch the portion E' may be adjusted so as to take up any wear of the sliding bolt B, and will be held in position by adjusting the set-screws $f f$. This raised portion upon the casting A' will also serve to hold the coupling-bolt which passes through the thill-iron in place should the nut be accidentally displaced. By means of the bolts $f f$, hereinbefore referred to, the cap or cover is also held in position.

By the means hereinbefore described I provide a device by which a horse, when it becomes unmanageable, can be readily detached from a vehicle, and the construction of the parts is such that they are not liable to get out of order, and will always be effective in operation, and the rattling of the parts will be prevented to a great extent, owing to the adjustment and spring-pressure.

Having thus described my invention, what I claim as new, and desire to secure by Letters Patent, is—

1. In a device for detaching horses from vehicles, the base A, provided with a bolt-receptacle, A', and upwardly-projecting ends A² A³, in combination with the coupling C, provided with a conical socket, spring-bolt B, and operating means, the parts being organized substantially as shown.

2. In a device for detaching shafts from vehicles, the spring-bolt B and operating means, in combination with the socket C, having secured thereto, so as to be capable of a rotary movement, the coupling D, substantially as shown, and for the purpose set forth.

3. In a device for detaching horses from vehicles, the frame or base A, having projecting portions A' A² A³, organized as shown, and bolt B, having rod b, encircled by a spiral spring, and provided with means for attaching a releasing mechanism, the coupling C, provided with a conical socket, and having secured thereto the thill-iron D, and an adjustable block secured above the sliding bolt, the parts being organized and combined substantially as shown, and for the purposes set forth.

In testimony whereof I affix my signature in presence of two witnesses.

OSCAR W. EISENHART.

Witnesses:
JOHN SCHLATMAN,
WILLIAM BOLTZ.